US005255021A

United States Patent [19]

Noguchi et al.

[11] Patent Number: 5,255,021

[45] Date of Patent: Oct. 19, 1993

[54] INK-JET PRINTER HAVING AN INK JET PRINT HEAD END OF LIFE DETECTION CIRCUIT

[75] Inventors: Tomoyuki Noguchi, Kasuga; Mitsuhide Matsuda, Umi; Tadashi Shiraishi, Kasuga; Hideaki Horio, Umi, all of Japan

[73] Assignee: Matsushita Electric Industrial Co., Ltd., Osaka, Japan

[21] Appl. No.: 861,050

[22] Filed: Apr. 1, 1992

[30] Foreign Application Priority Data

Apr. 5, 1991 [JP] Japan .................................. 3-72003

[51] Int. Cl.5 .......................................... G01D 15/16

[52] U.S. Cl. ............................ 346/140 R; 73/304 R; 324/522; 324/523; 324/548; 400/126

[58] Field of Search .................... 346/140 R; 400/126; 73/304 R; 116/227; 101/364; 324/522, 523, 548

[56] References Cited

U.S. PATENT DOCUMENTS 3,179,042 4/1965 Naiman .......................... 346/140 R
4,183,029 1/1980 Isayama et al. ................. 346/140 R
4,853,718 8/1989 El Hatem et al. ............. 346/140 R
4,996,487 2/1991 McSparran et al. ........... 224/523 X

FOREIGN PATENT DOCUMENTS 60-19539 1/1985 Japan .

*Primary Examiner*—A. T. Grimley
*Assistant Examiner*—J. E. Barlow, Jr.
*Attorney, Agent, or Firm*—Pollock, VandeSande & Priddy

[57] ABSTRACT

In an ink-jet printer of the type wherein a current is passed through a conductive ink contained between a pair of electrodes to cause the ink to become vaporized and cause trapped gasses or bubbles to expand suddenly, exerting a sufficient pressure upon the ink to force droplets of ink from a nozzle, a current value flowing between the electrodes is detected to determine the amount of wear of the electrodes, and when the detected current value is lower than a predetermined value, an alarm indicative of the replacement of the currently used ink-jet head is given and, at the same time, ejection of the ink from the nozzle is stopped. Thus, printing operation is always achieved with stable ejection of ink, guaranteeing high printing qualities.

10 Claims, 4 Drawing Sheets

INK-JET PRINTER HAVING AN INK JET PRINT HEAD END OF LIFE DETECTION CIRCUIT

BACKGROUND OF THE INVENTION

1. Field of the Invention

The present invention relates generally to bubble jet printing systems that use the volume change of bubbles produced by heat to spray small jets of conductive ink on plain paper. More particularly, this invention is concerned with an ink-jet printer of the excitation type wherein a current is passed through a conductive ink to cause the ink to become vaporized and cause any trapped gases or bubbles to expand, forcing droplets of ink to jet onto the surface of a material to be printed upon.

2. Description of the Prior Art

A conventional ink-jet printer includes, as shown here in FIG. 4, an ink-jet head 1 having an ink tank 3 for holding therein a conductive ink 2, and a nozzle 4 connected to an end of the ink tank 3. The nozzle 4 is open at an ink tank side and closed at the opposite side. The ink tank 3 and the nozzle 4 communicate with each other via an ink passage 5, so that the conductive ink 2 held in the ink tank 3 is allowed to flow through the ink passage 5 into the nozzle 4. The nozzle 4 has in its peripheral wall a discharge hole 6 from which the conductive ink is ejected in the form of droplets. A pair of electrodes 7 and 8 is disposed on an inside wall of the nozzle 4 at a position diametrically opposite to the discharge hole 6. To the electrodes 7, 8, a voltage is applied by an electrode exciting device or unit 9 which is controlled by an output signal sent from a central processing unit (CPU) 10. Numeral 11 is a power supply for supplying electrical power to the electrode exciting unit 9, and numeral 12 is a current flowing through the conductive ink 2 when the voltage is applied across the electrodes 7 and 8.

The conventional ink-jet printer of the foregoing construction operates as follows.

When the CPU 10 sends a low level signal to the electrode exciting unit 9, the electrode exciting unit 9 is in an inoperative or "off" state and the ink-jet printer is in the stand-by condition. When the CPU 10 sends a high level signal to the electrode exciting device 8, the electrode exciting unit 9 is operated or turned on whereupon a voltage from the power supply 11 is applied across the electrodes 7 and 8. Upon application of the voltage to these electrodes 7, 8, a current 12 is passed through the conductive ink 2 contained between the electrodes 7, 8, causing the generation of heat which in turn will vaporize that portion of the conductive ink 2 contained between the electrodes 7 and 8. Gases or bubbles produced on vaporization expand suddenly, exerting a sufficient pressure upon the conductive ink 2 to force the conductive ink 2 to eject from the discharge hole 6 of the nozzle 4 to the surface of a material to be printed upon.

Thereafter, the electrode exciting unit 9 is turned off or de-energized whereupon the current 12 flowing between the electrodes 7 and 8 disappears. Consequently, heat of the bubbles produced in the conductive ink 2 is immediately taken up by the surrounding conductive ink 2 and the bubbles disappear soon. Thus, the ink-jet printer is returned to the stand-by condition.

According to the foregoing construction, due to electrolytic corrosion and cavitation caused by repeated generation and disappearance of the bubbles, the electrodes 7 and 8 wear down gradually with the result that the distance between the electrodes 7 and 8 increases progressively. As the inter-electrode distance increases, the current 12 flowing through the conductive ink 2 contained between the electrodes 7 and 8 decreases. With this reduction of the current 12, only an insufficient heat energy can be produced in order to vaporize the conductive ink 2. Under such condition, a stable spouting of the conductive ink 2 is no longer possible. If printing operation continues with such unstable spouting of ink. the printing quality is significantly deteriorated.

SUMMARY OF THE INVENTION

With the foregoing drawbacks of the prior art in view, it is an object of the present invention to provide an improved ink-jet printer which is capable of detecting the end of a lifetime of an ink-jet head, thus insuring a stable operation of the ink-jet head with high printing qualities.

Another object of the present invention is to provide an ink-jet printer incorporating structural features which make it possible to stop operation of the current ink-jet and give a visual warning on the replacement with a new ink-jet head, upon expiration of a lifetime of the current ink-jet head.

According to the invention, there is provided an ink-jet printer which comprises: an ink-jet head having an ink tank for holding therein a conductive ink, a nozzle associated with the ink tank, and a pair of electrodes disposed on a portion of an inside wall of the ink tank; electrode excitation means for applying a voltage to the electrodes; current detection means for detecting a current value flowing through a portion of the conductive ink contained between the electrodes; and lifetime detection means for producing an output signal indicative of the end of a lifetime of the ink-jet head based on an output from the current detection means.

The ink-jet printer may further include alarm means for displaying the lifetime end of the ink-jet printer in response to the output signal received from the lifetime detection means, and/or stop means for stopping application of the voltage from the electrode excitation means to the electrodes, in response to the output signal received from the lifetime detection means.

Preferably, the lifetime detection means is operated to detect the current value issued from the current detection means and produces a lifetime end signal when the detected current value is less than a predetermined value.

The above and other objects, features and advantages of the present invention will become more apparent from the following description when making reference to the detailed description and the-accompanying sheets of drawings in which a preferred structural embodiment incorporating the principles of the present invention is shown by way of illustrative example.

DETAILED DESCRIPTION OF THE INVENTION

Figure 2:
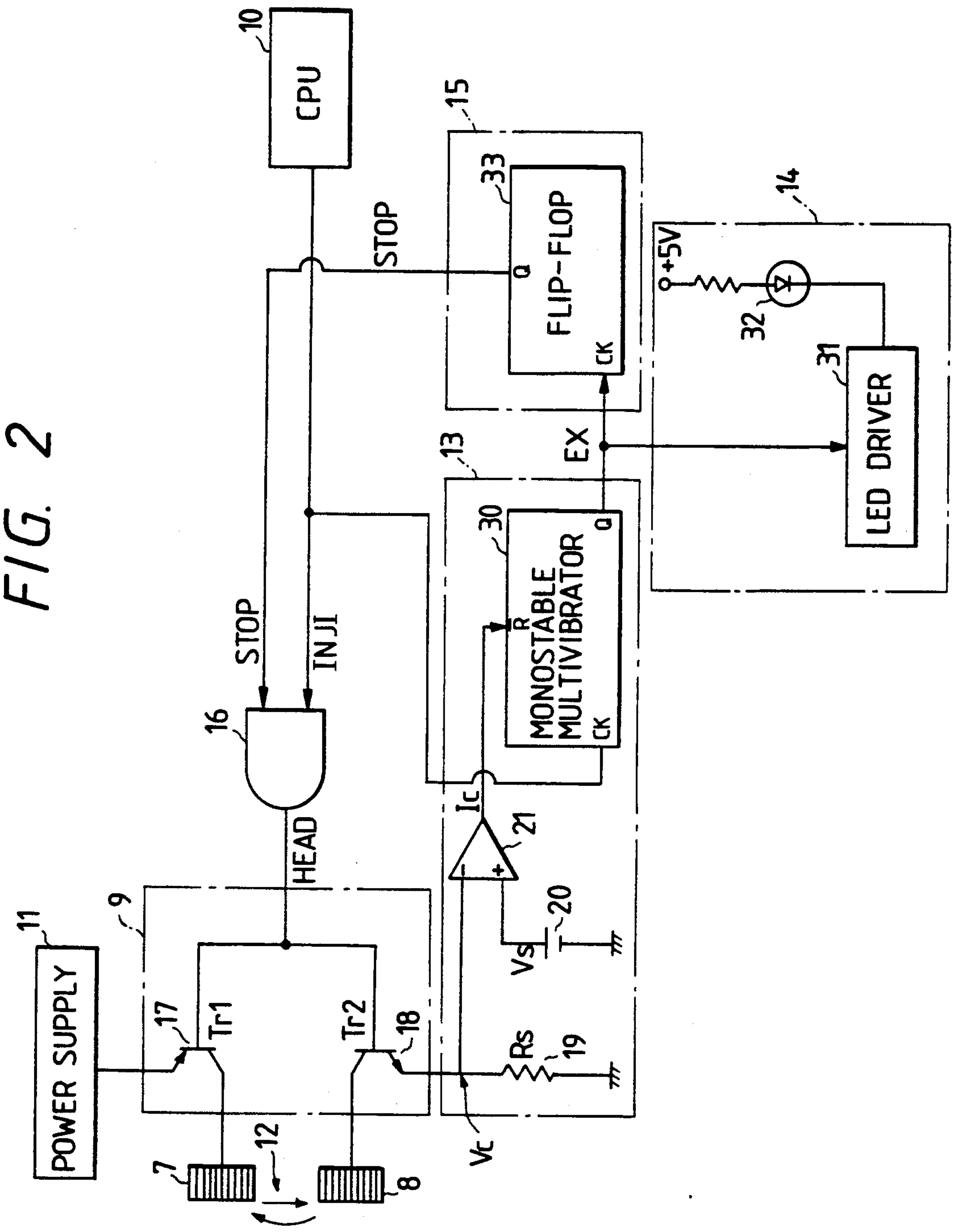
FIG. 2 is a circuit diagram of the ink-jet printer.
Figure 3:
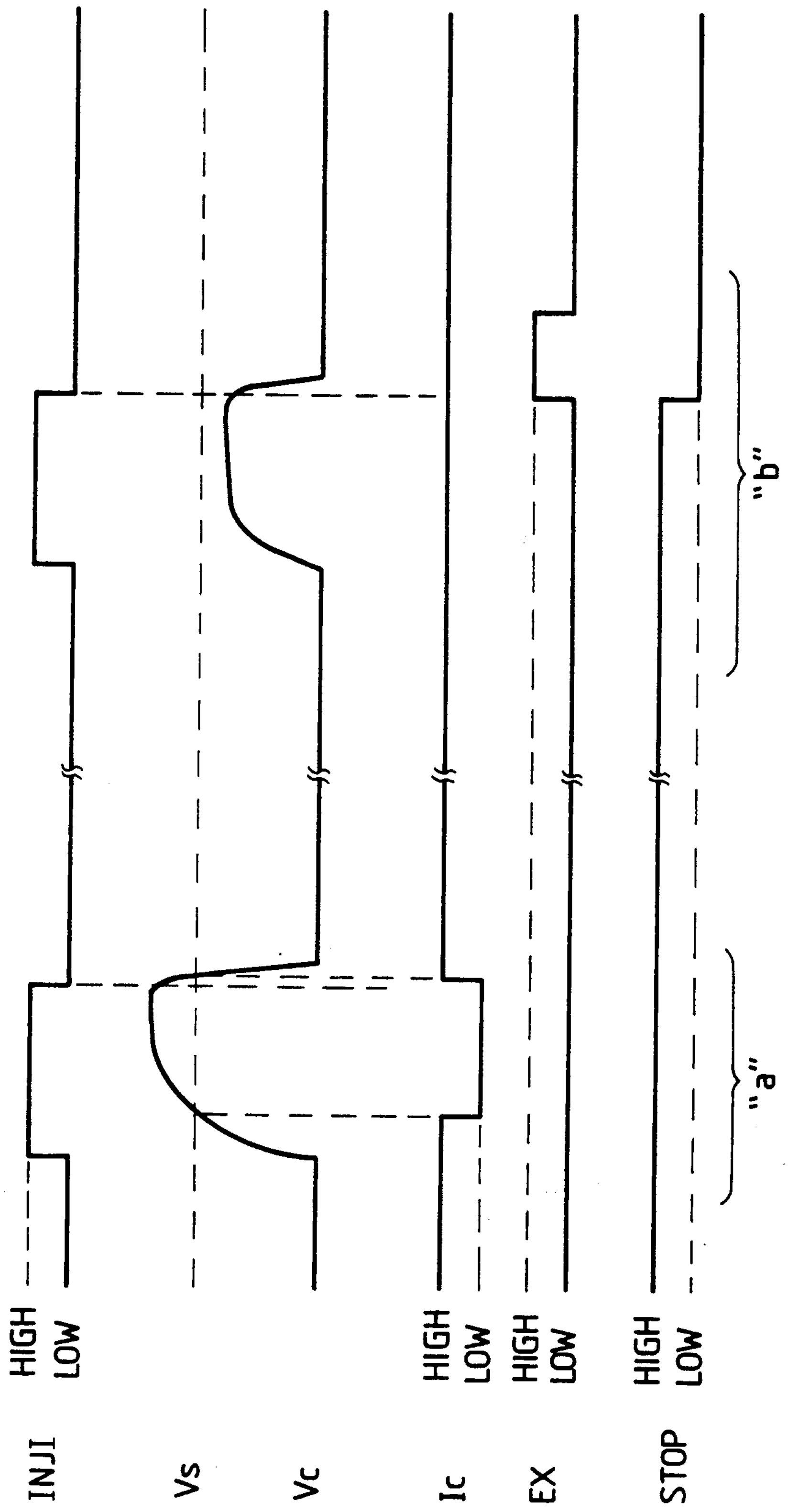
FIG. 3 is a timing chart illustrative of the operation of the ink-jet printer.
Figure 4:
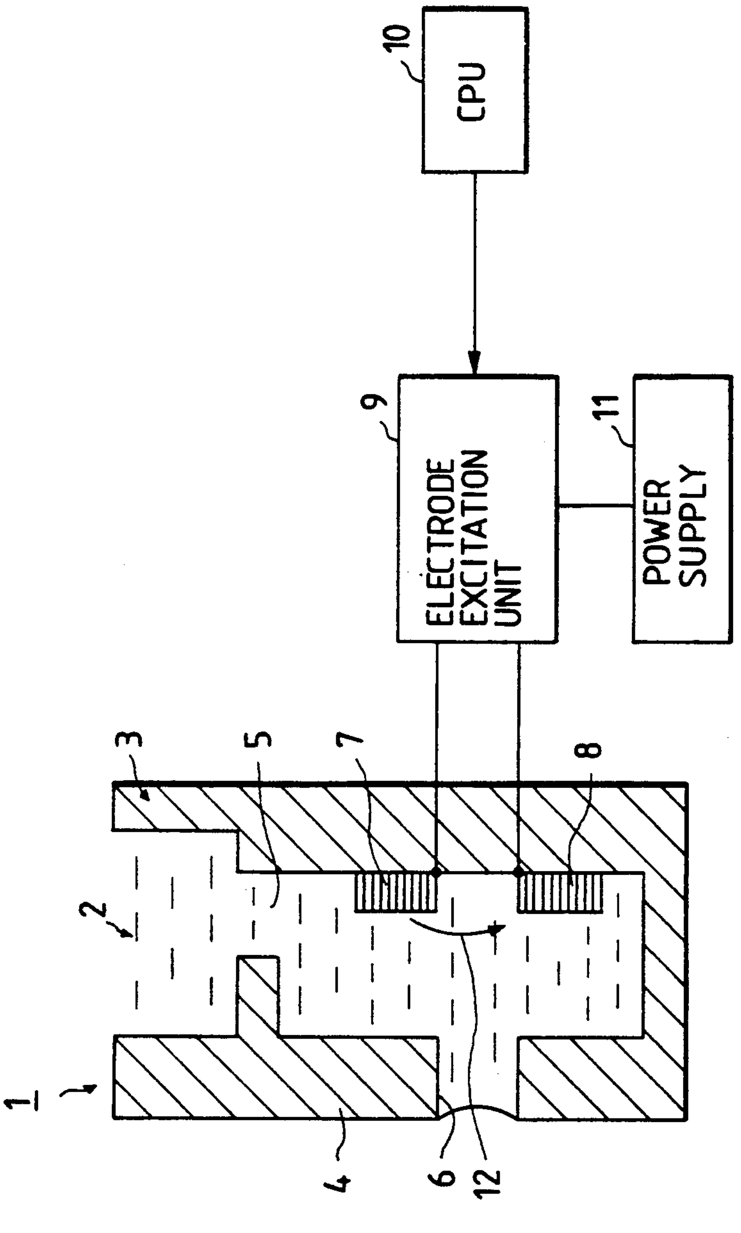
FIG. 4 PRIOR ART
FIG. 4 is a diagrammatical view showing the general construction of a conventional ink-jet printer.

The present invention will be described hereinbelow in greater detail with reference to a preferred embodiment shown in FIGS. 1 through 3.

Figure 1:
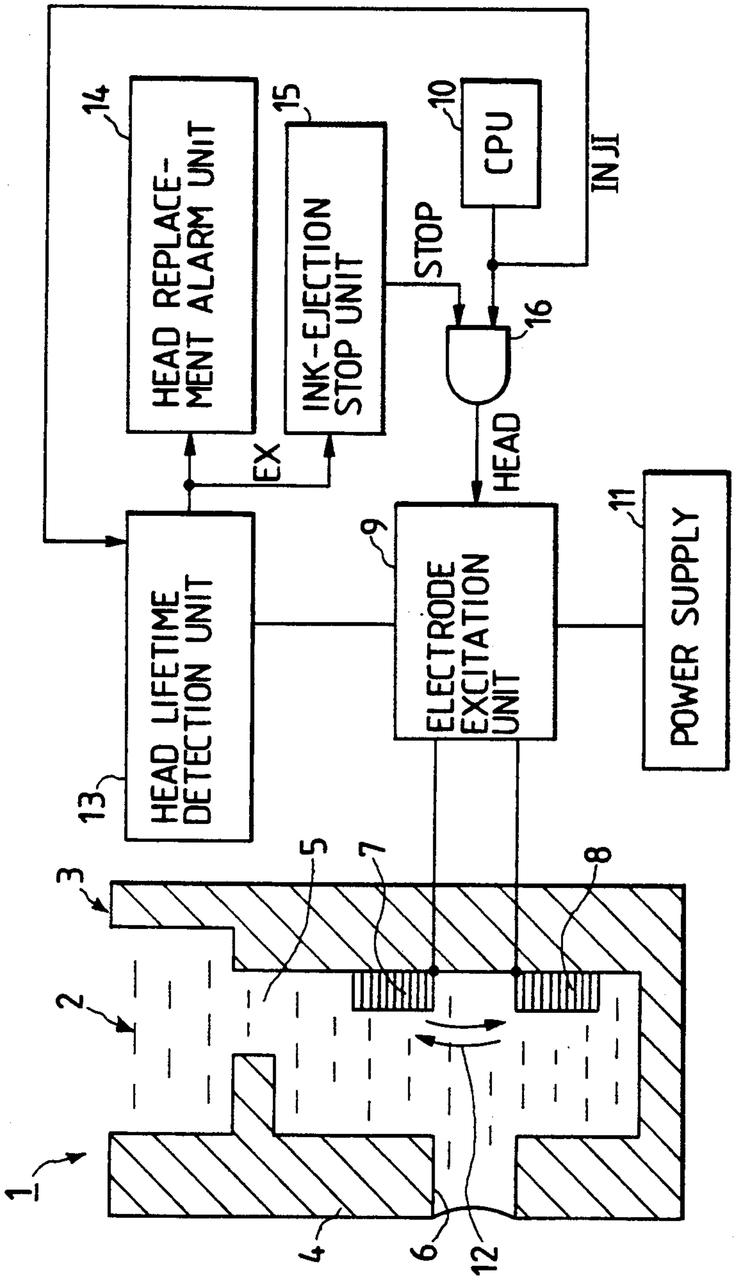
FIG. 1 is a diagrammatical view showing general construction of an ink-jet printer according to one embodiment of the present invention.

FIG. 1 diagrammatically shows the construction of an ink-jet printer according to one embodiment of this invention. The ink-jet printer includes an ink-jet head 1 having an ink tank 3 containing therein a conductive ink 2, and a nozzle 4 provided at an end of the ink tank 3. The nozzle 4 is open at an ink tank 3 side and closed at the opposite side remote from the ink tank 3. The ink tank 3 communicates with the nozzle 4 via an ink passage 5 so that the conductive ink 2 held in the ink tank 3 is allowed to flow through the ink passage 5 into the nozzle 4. The nozzle 4 has in its peripheral wall a discharge hole 6 from which droplets of the conductive ink 2 are ejected. A pair of electrodes 7 and 8 is disposed on an inside wall of the nozzle 4 at a position diametrically opposite to the discharge hole 6 of the nozzle 4. To the electrodes 7 and 8 is applied a pulse voltage produced from an electrode excitation means or unit 9. The pulse voltage has opposite polarities so that the direction of the applied voltage changes or shifts for each pulse so as to minimize deterioration of the characteristics of the electrodes 7, 8. The electrode excitation unit 9 is controlled by an INJI signal delivered from a central processing unit (CPU) 10. Numeral 11 is a power supply for supplying electrical power to the electrode excitation unit 9, and numeral 12 is a current flowing through the conductive ink 12 contained between the electrodes 7 and 8 when the voltage is applied across the electrodes 7 and 8.

The ink-jet printer of this invention further includes a head lifetime detection means or unit 13 for detecting the current 12 flowing between the electrodes 7 and 8 and outputting an EX signal indicative of the end of a lifetime of the ink-jet head 1 when the detected current value is lower than a predetermined current value. Numeral 14 is a head replacement alarm means or unit for indicating the lifetime end of the ink-jet head 1 in response to the EX signal received from the head lifetime detection unit 13. The Ex signal produced from the head lifetime detection unit 13 is also supplied to an ink-ejection stop means or unit 15 for stopping ejection of the conductive ink 2 from the nozzle 4. Numeral 16 is an AND circuit or gate which delivers an output signal of binary 1 to the electrode exciting unit 9 based on the logical product of a STOP signal received from the ink-ejection stop unit 15 and the INJI signal received from the CPU 10.

Operation of the ink-jet printer of the foregoing construction will be described below with reference to the circuit diagram shown in FIG. 2 and the timing chart shown in FIG. 3.

In the normal condition, the ink-ejection stop unit 15 delivers a high (H) level STOP signal to the AND circuit 16. In this condition, when the CPU 10 delivers a high (H) level INJI signal to the AND circuit 16, the AND circuit 16 delivers a high (H) level HEAD signal to a first transistor (Tr1) 17 and a second transistor (Tr2) 18, thereby turning on the first and second transistors 17, 18. With these transistors 17 and 18 in the on state, a current is passed through the conductive ink 12 contained between the electrodes 7 and 8, as indicated by the arrows 12 in FIG. 2. The current 12 causes the generation of heat which in turn will vaporize that portion of the conductive ink 2 contained between the electrodes 7 and 8. Trapped gases or bubbles produced upon vaporization expand suddenly, thereby exerting a sufficient pressure upon the conductive ink 2 to eject the conductive ink 12 from the discharge hole 6 of the nozzle 4 (FIG. 1) onto the surface of a material (not shown) to be printed upon. After ejection of the conductive ink 2, the CPU 10 sends a low (L) level INJI signal to the AND circuit 16 which in turn will send a low (L) level HEAD signal to the first and second transistors 17 and 18. Thus, the first and second transistors 17 and 18 turn off and, hence, no current flows between the electrodes 7 and 8. In this condition, since heat of the bubbles produced in the conductive ink 2 is suddenly taken up by the surrounding conductive ink 2, the bubbles disappear soon. Thus, the ink-jet printer returns to the initial stand-by condition in for preparation for the next ejection of the conductive ink 2.

During a long use of the printer, the current 12 gradually decreases due to wear and electrolytic corrosion of the electrodes 7 and 8 caused mainly by repeated cycles of generation and disappearance of bubbles. With this reduction of the current 12, ejection of the conductive ink 2 becomes unstable, deteriorating the printing quality. In order to avoid this, the ink-jet head 1 must be replaced before a lifetime of the ink-jet head 1 expires.

In the head lifetime sensor 13, the current 12 flowing between the electrodes 7 and 8 is converted by a detection resistance (Rs) 19 into a voltage Vc. The voltage Vc is in turn compared by a comparator 21 with a reference voltage Vs supplied from a reference voltage supply 20. The comparator 21 delivers a comparison signal Ic to a monostable multivibrator 30. In the monostable multivibrator 30, if the Ic signal is at the low (L) level when the INJI signal shifts from the high (H) level to the low (L) level (at the moment "a" of the timing chart shown in FIG. 3), then the ink-jet head 1 is assumed to be still operative and effectively usable. On the other hand, if the Ic signal is at the high (H) level when the INJI signal shifts from the high (H) level to the low (L) level (at the moment "b" of the timing chart shown in FIG. 3), the ink-jet head 1 is assumed to be at the end of its lifetime. In the latter case, the monostable multivibrator 30 sends an EX pulse signal to the head replacement alarm unit 14 and the ink-ejection stop unit 15.

Upon receipt of the EX pulse signal, the head replacement alarm unit 14 operates an LED (light emitting diode) driver 31 to excite an LED 32, thereby giving a visual warning or alarm to the user on the replacement of the ink-jet head 1.

On the other hand, upon arrival of the EX pulse signal at the ink-ejection stop unit 15, a flip-flop circuit 33 of the ink-ejection stop unit 15 shifts the STOP signal from a high (H) level to a low (L) level and delivers the low level STOP signal to the AND circuit 16 which in turn issues a low (L) level HEAD signal to the first and second transistors (Tr1 and Tr2) 17 and 18, thereby turning off these transistors 17, 18. Thus, no current flows between the electrodes 7 and 8 and, accordingly, ejection of the conductive ink 2 is stopped.

As described above, the current value flowing between two electrodes 7 and 8 is detected. The detected current value is used to determine the amount of wear of the electrodes 7 and 8 in making a judgment as to whether the ink-jet head 1 must be replaced or not. When the detected current value is lower than a predetermined value, a visual alarm or warning on the replacement of the ink-jet head 1 is given and, at the same time, ejection of the ink 2 is stopped immediately. Thus, printing with unstable jets of ink does not take place any more and, hence, the printing quality is not deteriorated. In other words, printing operation continues stably throughout a lifetime of the ink-jet head 1.

Obviously, various minor changes and modifications of the present invention are possible in the light of the above teaching. It is therefore to be understood that within the scope of the appended claims the invention may be practiced otherwise than as specifically described.

What is claimed is:

1. An ink-jet printer, comprising:

an ink-jet head having an ink tank for holding therein a conductive ink, a nozzle associated with said ink tank, and a pair of electrodes disposed on a portion of an inside wall of said ink tank;

electrode excitation means for applying a voltage to said pair of electrodes such that a current is passed through that portion of said conductive ink contained between said pair of electrodes to cause said portion of the conductive ink to become vaporized to produce bubbles and cause said bubbles to expand suddenly, exerting a sufficient pressure onto said conductive ink to expel droplets of conductive ink from said nozzle;

current detection means for detecting a current value flowing through said portion of the conductive ink contained between said pair of electrodes; and lifetime detection means for producing an output signal indicative of the end of a lifetime of said pair of electrodes based on an output from said current detection means.

2. An ink-jet printer according to claim 1, wherein said lifetime detection means is operated to detect said current value issued from said current detection means and produces a lifetime end signal when the detected current value is less than a predetermined value.

3. An ink-jet printer, comprising:

an ink-jet head having a ink tank for holding therein a conductive ink, a nozzle associated with said ink tank, and a pair of electrodes disposed on a portion of an inside wall of said ink tank;

electrode excitation means for applying a voltage to said pair of electrodes such that a current is passed through that portion of said conductive ink contained between said pair of electrodes to cause said portion of the conductive ink to become vaporized to produce bubbles and cause said bubbles to expand suddenly, exerting a sufficient pressure onto said conductive ink to expel droplets of conductive ink from said nozzle;

current detection means for detecting a current value flowing through said portion of the conductive ink contained between said pair of electrodes;

lifetime detection means for producing an output signal indicative of the end of a lifetime of said pair of electrodes based on an output from said current detection means; and alarm means for displaying the lifetime end of said pair of electrodes in response to said output signal received from said lifetime detection means.

4. An ink-jet printer according to claim 3, wherein said lifetime detection means is operated to detect said current value issued from said current detection means and produces a lifetime end signal when the detected current value is less than a predetermined value.

5. An ink-jet printer, comprising:

an ink-jet head having an ink tank for holding therein a conductive ink, a nozzle associated with said ink tank, and a pair of electrodes disposed on a portion of an inside wall of said ink tank;

electrode excitation means for applying a voltage to said pair of electrodes such that a current is passed through that portion of said conductive ink contained between said pair of electrodes to cause said portion of the conductive ink to become vaporized to produce bubbles and cause said bubbles to expand suddenly, exerting a sufficient pressure onto said conductive ink to expel droplets of conductive ink from said nozzle;

current detection means for detecting a current value flowing through said portion of the conductive ink contained between said pair of electrodes;

lifetime detection means for producing an output signal indicative of the end of a lifetime of said pair of electrodes base don an output from said current detection means; and stop means for stopping application of said voltage from said electrode excitation means to said pair of electrodes, in response to said output signal received from said lifetime detection means.

6. An ink-jet printer according to claim 5, wherein said lifetime detection means is operated to detect said current value issued from said current detection means and produces a lifetime end signal when the detected current value is less than a predetermined value.

7. An ink-jet printer comprising:

an ink-jet head having an ink tank for holding therein a conductive ink, a nozzle associated with said ink tank, and a pair of electrodes disposed on a portion of an inside wall of said ink tank;

electrode excitation means for applying a voltage to said pair of electrodes such that a current is passed through that portion of said conductive ink contained between said pair of electrodes to cause a part of said portion of the conductive ink to become vaporized to produce bubbles and cause said bubbles to expand suddenly, exerting a sufficient pressure onto said conductive ink to expel droplets of conductive ink form said nozzle;

current detection means for detecting a current value flowing through said portion of the conductive ink contained between said pair of electrodes;

lifetime detection means for producing an output signal indicative of the end of a lifetime of said pair of electrodes based on an output from said current detection means;

alarm means for displaying the lifetime end of said pair of electrodes in response to said output signal received from said lifetime detection means; and stop means for stopping application of said voltage from said electrode excitation means to said pair of electrodes in response to said output signal received from said lifetime detection means.

8. An ink-jet printer according to claim 7, wherein said lifetime detection means is operated to detect said current value issued from said current detection means and produces a lifetime end signal when the detected current value is less than a predetermined value.

9. An ink-jet printer, comprising:

an ink-jet head having an ink tank for holding therein a conductive ink, a nozzle associated with said ink tank, and a pair of electrodes disposed on a portion of an inside wall of said ink tank;

electrode excitation means for applying a voltage to said pair of electrodes such that a current is passed through that portion of said conductive ink contained between said pair of electrodes to cause said portion of the conductive ink to become vaporized to produce bubbles and cause said bubbles to expand suddenly, exerting a sufficient pressure onto said conductive ink to expel droplets of conductive ink from said nozzle;

current detection means for detecting a current value flowing through said portion of the conductive ink contained between said pair of electrodes when said portion of the conductive ink is vaporized; and lifetime detection means for producing an output signal indicative of the end of a lifetime of said pair of electrodes based on an output from said current detection means.

10. An ink-jet printer according to claim 9, wherein said lifetime detection means is operated to detect said current value issued from said current detection means and produces a lifetime end signal when the detected current value is less than a predetermined value.

* * * * *